US012530203B2

(12) United States Patent
Gupta et al.

(10) Patent No.: US 12,530,203 B2
(45) Date of Patent: Jan. 20, 2026

(54) COLLABORATIVE SOFTWARE APPLICATION FRAMEWORKS USING INTERNAL SERVICE PLUGINS AND EXTERNAL SERVICE PLUGINS

(71) Applicants: ATLASSIAN PTY LTD., Sydney (AU); ATLASSIAN US, INC., San Francisco, CA (US)

(72) Inventors: Vipul Gupta, Bangalore (IN); Ujjawal Kumar Ravi, Bengaluru (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 386 days.

(21) Appl. No.: 17/587,251

(22) Filed: Jan. 28, 2022

(65) Prior Publication Data

US 2023/0244499 A1  Aug. 3, 2023

(51) Int. Cl.
G06F 9/44 (2018.01)
G06F 9/445 (2018.01)
G06F 9/54 (2006.01)

(52) U.S. Cl.
CPC .......... *G06F 9/44526* (2013.01); *G06F 9/546* (2013.01)

(58) Field of Classification Search
CPC .............................. G06F 9/44526; G06F 9/546
See application file for complete search history.

(56) References Cited

U.S. PATENT DOCUMENTS

| 2005/0096950 A1* | 5/2005 | Caplan ............. G06Q 10/06395 705/7.41 |
| 2007/0297590 A1* | 12/2007 | Macbeth ................ G06Q 10/00 379/201.02 |
| 2008/0018652 A1* | 1/2008 | Toelle .................. G06T 15/005 345/506 |
| 2008/0250423 A1* | 10/2008 | Bush .................. H04B 7/18506 701/423 |
| 2008/0271059 A1* | 10/2008 | Ott ............................ G06F 9/54 719/328 |
| 2009/0234903 A1* | 9/2009 | Lomelli ................ G06F 9/5055 709/201 |
| 2012/0233668 A1* | 9/2012 | Leafe .................. G06F 9/44526 726/4 |
| 2013/0332525 A1* | 12/2013 | Liu ........................ G06Q 50/01 709/204 |
| 2014/0250306 A1* | 9/2014 | Ziegler ................... H04L 63/20 726/17 |
| 2016/0099984 A1* | 4/2016 | Karagiannis ........ H04L 12/1822 709/204 |

(Continued)

Primary Examiner — Tuan C Dao
(74) Attorney, Agent, or Firm — Alston & Bird LLP

(57) ABSTRACT

Various embodiments of the present invention provide methods, apparatuses, systems, computing devices, and/or the like that are configured to enable effective and efficient solutions for designing software architecture of collaborative software application frameworks. For example, certain embodiments of the present invention provide methods, apparatuses, systems, computing devices, and/or the like that are configured to enable communications between a collaboration service computing device and a set of m service components via m service plugins comprising internal service plugins and external service plugin, where each service plugin comprises an asynchronous processing queue and a continuous execution thread.

20 Claims, 8 Drawing Sheets

(56) References Cited

U.S. PATENT DOCUMENTS

| | | | |
|---|---|---|---|
| 2017/0171231 A1* | 6/2017 | Reybok, Jr. | H04L 63/1433 |
| 2018/0173542 A1* | 6/2018 | Chan | G06F 9/451 |
| 2020/0066397 A1* | 2/2020 | Rai | G06N 20/00 |
| 2022/0085648 A1* | 3/2022 | Colombo | H02J 13/00004 |

* cited by examiner

COLLABORATIVE SOFTWARE APPLICATION FRAMEWORKS USING INTERNAL SERVICE PLUGINS AND EXTERNAL SERVICE PLUGINS

BACKGROUND

Various methods, apparatuses, and systems are configured to provide techniques for designing software architecture of collaborative software application frameworks that interact with internal service components and external service components. Applicant has identified many deficiencies and problems associated with existing methods, apparatuses, and systems for designing software architecture of collaborative software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient solutions for designing software architecture of collaborative software application frameworks. For example, certain embodiments of the present invention provide methods, apparatuses, systems, computing devices, and/or the like that are configured to enable communications between a collaboration service computing device and a set of m service components via m service plugins comprising internal service plugins and external service plugin, where each service plugin comprises an asynchronous processing queue operating on a continuous execution thread.

In accordance with one aspect, a computer-implemented method is provided. In one embodiment, the computer-implemented method comprises: receiving a service management request, wherein the service management request is associated with one or more request parameters; determining, based on the one or more request parameters and using a routing policy for a plurality of service plugins, a target plugin subset of the plurality of service plugins, wherein each plugin is associated with a corresponding service component; for each target plugin in the target plugin subset: transmitting an internal protocol request associated with the target plugin to an asynchronous processing queue associated with the target plugin, and in response to the internal protocol request, receiving a per-plugin action result indicator that is generated by the service component associated with the target plugin based on the internal protocol request for the target plugin; transmitting an action result message describing an action result state to an external communication channel associated with the service management request, wherein the action result state is determined based on each per-plugin action result indicator.

In accordance with another aspect, a computer program product is provided. The computer program product may comprise at least one computer-readable storage medium having computer-readable program code portions stored therein, the computer-readable program code portions comprising executable portions configured to: receive a service management request, wherein the service management request is associated with one or more request parameters; determining, based on the one or more request parameters and using a routing policy for a plurality of service plugins, a target plugin subset of the plurality of service plugins, wherein each plugin is associated with a corresponding service component; for each target plugin in the target plugin subset: transmit an internal protocol request associated with the target plugin to an asynchronous processing queue associated with the target plugin, and in response to the internal protocol request, receive a per-plugin action result indicator that is generated by the service component associated with the target plugin based on the internal protocol request for the target plugin; transmit an action result message describing an action result state to an external communication channel associated with the service management request, wherein the action result state is determined based on each per-plugin action result indicator.

In accordance with yet another aspect, an apparatus comprising at least one processor and at least one memory including computer program code is provided. In one embodiment, the at least one memory and the computer program code may be configured to, with the processor, cause the apparatus to: receive a service management request, wherein the service management request is associated with one or more request parameters; determining, based on the one or more request parameters and using a routing policy for a plurality of service plugins, a target plugin subset of the plurality of service plugins, wherein each plugin is associated with a corresponding service component; for each target plugin in the target plugin subset: transmit an internal protocol request associated with the target plugin to an asynchronous processing queue associated with the target plugin, and in response to the internal protocol request, receive a per-plugin action result indicator that is generated by the service component associated with the target plugin based on the internal protocol request for the target plugin; transmit an action result message describing an action result state to an external communication channel associated with the service management request, wherein the action result state is determined based on each per-plugin action result indicator.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1:
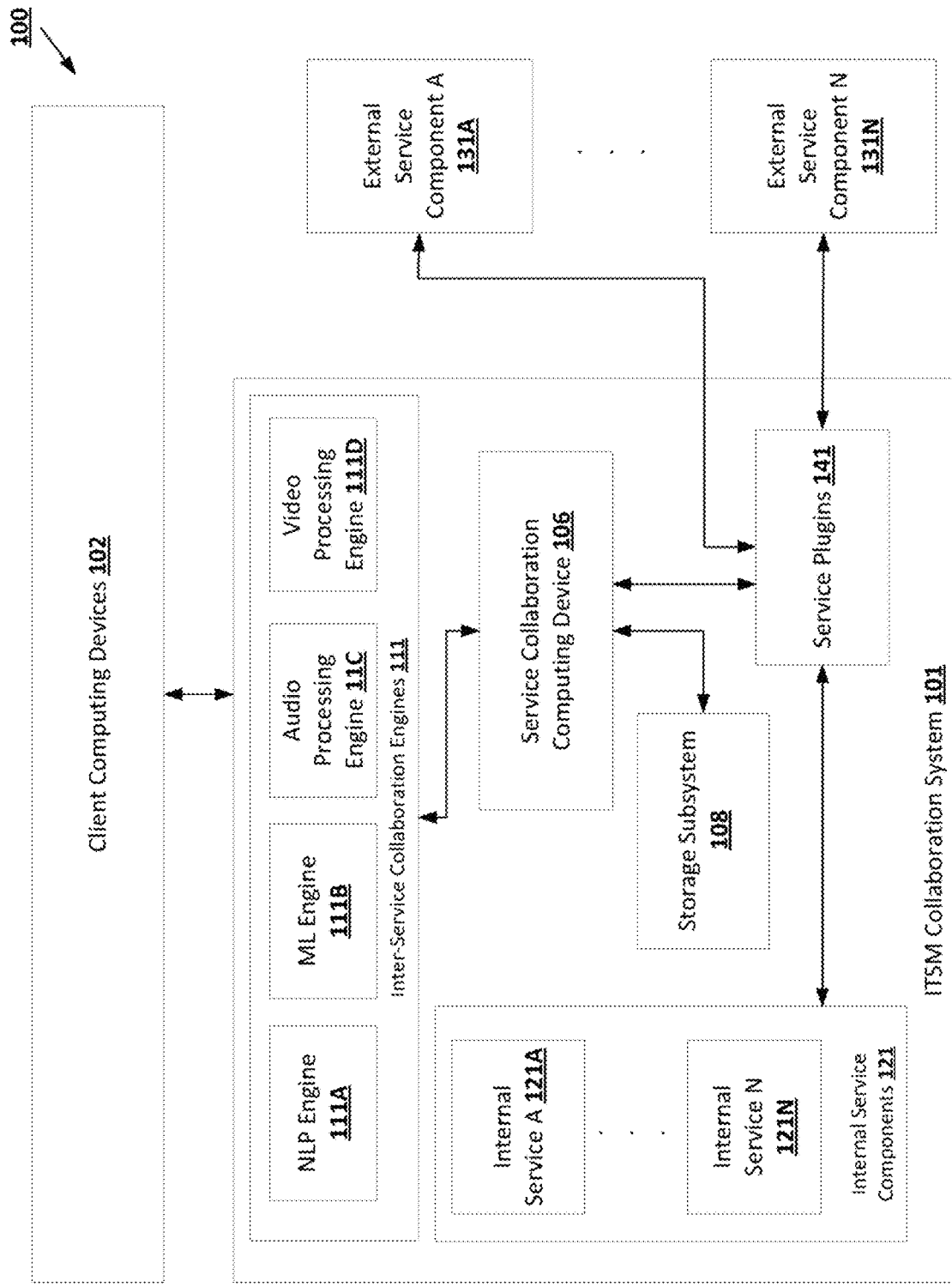
FIG. 1 is a block diagram of an example architecture within which at least some embodiments of the present invention may operate.

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably designing software architectures for collaborative software application frameworks that enable interactions between an Information Technology Service Management (ITSM) collaboration system and a set of service components including internal service components and external service components. The disclosed techniques can be utilized by an ITSM collaboration system to enable collaborative ingesting, normalizing, and aggregation of service management requests across a plurality of service components comprising one or more internal service components and one or more external service components. An example of such an ITSM collaboration system is a software application system that enables aggregating data corresponding to incident management requests provided to the Jira incident management system, provided by Atlassian PTY LTD, with incident metadata (e.g., software development communication metadata, software development ticket metadata, and/or the like) provided using one or more communication software application components, one or more software analytics reporting frameworks, and/or the like.

A complex collaborative software application framework is typically configured to enable interactions between an ITSM collaboration system and a large number of complex service components each corresponding to a complex software application framework. A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at the individual, team, and enterprise level. Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Accordingly, when an ITSM collaboration system is configured to interact with a large number of complex software application frameworks, to enable effective communication with the large number of complex software application frameworks, the ITSM collaboration system needs access to data describing configuration parameters of the large number of complex software application frameworks in a manner that enables generating properly-formatted invocations of each complex software application framework as well as properly interpreting output of data of each complex software application framework. This is a challenge that is multiplied as the number of complex software application frameworks grows, creating substantial obstacles for scalable deployment of various existing ITSM collaboration systems in environments that include a large number of complex software application frameworks.

For example, consider a scenario in which an ITSM collaboration system interacts with m distinct service components, where $m_1$ of the m distinct service components are associated with external service components each having a distinct authentication logic and a distinct application programming interface (API) schema, and where $m_2$ of the m distinct service components are associated with internal service components each having a distinct authentication logic and a distinct application programming interface (API) schema. In a naïve implementation, the service management requests of the ITSM collaboration system that trigger interactions with the m distinct service components are placed on a single queue and handled with a single execution thread. In this implementation, during each processing iteration, the single execution thread needs to retrieve data associated with m distinct service components and process filters corresponding to the m distinct service components before properly handling a service management request that is retrieved during the noted processing iteration. This means that, assuming a constant amount of per-component configuration data, each processing iteration has a computational complexity of at least O(m) for just performing pre-processing handling of a service management request, with m growing potentially exponentially as the number of service components grows and as the complexity of each service component grows.

To address the noted challenges associated with designing software architecture of collaborative software application frameworks that enable interactions between an ITSM collaboration system and a set of service components including internal service components and external service components, various embodiments of the present invention utilize m service plugins, where each service plugin is associated with a respective service component and is configured to process service management requests associated with a single service component only. In some of the noted embodiments, each service plugin has an asynchronous processing queue and a continuous execution thread that are only used for processing service management requests associated with the respective service component that is associated with the particular service plugin.

Accordingly, in some embodiments, an ITSM collaboration system communicates, via a set of service plugins, with a set of service components that comprise a set of internal service components and a set of external service components. An internal service component may be a software application that is executed using processing resources that are local/internal to the ITSM collaboration system, while an external service component may be a software application that is executed using processing resources that are remote/external to the ITSM collaboration system. In some embodiments, communications between an external service component and the ITSM collaboration system is performed using an external service plugin that is configured to establish a remote connection with the external service component using an access credentialing logic associated with the external service component. In some embodiments, communications between an internal service component and the ITSM collaboration system is performed using an internal service plugin that is configured to establish a remote connection with the external service component without using any access credentialing logic associated with the internal service component.

By using the techniques noted above, during each processing iteration, an ITSM collaboration system performs m operations, where each operation corresponds to the continuous execution thread of a distinct service plugin that is associated with a distinct service component. Accordingly, each of the m operations needs to only retrieve configuration data associated with a single service component, which has a constant computational complexity assuming a constant amount of per-component configuration data. In this way, various embodiments of the present invention reduce the computational complexity of performing operations needed to facilitate communications between an ITSM collaboration system and a set of service components including internal service components and external service components, and improve computational efficiency of designing software architecture of collaborative software application frameworks that enable interactions between an ITSM collaboration system and a set of service components including internal service components and external service components.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the serviced collaboration computing device 106 of FIG. 1. In some embodiments, a server computing device communicates with one or more client computing devices using one or more computer networks.

The term "service management request" may refer to a data construct that is configured to describe a request generated by a client computing device and transmitted by the client computing device to an ITSM collaboration system. The service management request is a request for performing end-to-end delivery of an information technology service described by the service management request. An example of an information technology service is an incident management service, such as an incident management service that is performed by an incident management ITSM collaboration system such as a Jira Service Management (JSM) platform. In some embodiments, the service management request describes a set of request parameters that describe one or more features of the corresponding information technology service requested by the service management request. In some embodiments, the service management request is mapped to a set of target plugins using a routing policy which maps the request parameters of the service management request to a target subset of a set of service plugins associated with an ITSM collaboration system.

The term "request parameter" may refer to a data construct that is generated by a client computing and transmitted by the client computing device to an ITSM collaboration system as part of a service management request. A request parameter describes a feature of an information technology service requested by a service management request, such as a feature of an incident management service requested by a service management. Examples of request parameters include a request parameter that describes a source software application platform executed by the client computing device through which the end user has provided underlying inputs used to generate the request parameters of the corresponding service management request. For example, such as a source indicator request parameter may describe that a service management request describing an incident management request has been generated via a text input provided to a text-based communication software application, via an audiovisual input provided to a videoconferencing software application, via an audio input provided to an audio-based personal assistant software application. Other examples of request parameters include a request parameter describing a generation time of a service management request, a request parameter describing a transmission/receipt time of a service management request, a request parameter describing an incident category of a service management, a request parameter describing an inferred incident topic of a service management request, a request parameter describing an external guidance resource associated with a service management request, and/or the like. As described above, in some embodiments, a service management request is mapped to a target subset from a set of service plugins of an ITSM collaboration system using a routing policy.

The term "routing policy" may refer to a data construct that is stored as part of configuration data for an ITSM collaboration system and on a storage subsystem of the ITSM collaboration system. The routing policy describes user-defined rules/guidelines and/or inferred rules/guidelines for mapping a service management request to a target subset from a set of service plugin of the ITSM collaboration system. In some embodiments, an inferred rule/guideline of a routing policy may be determined by clustering a group of historical service management requests each associated with n request parameters and using an n-dimensional clustering space, and then associating each inferred cluster to a related subset of the plugins of the ITSM collaboration system based on user-defined cluster-plugin association data. For example, in some embodiments, generating a set of inferred rule/guidelines comprises: (i) identifying a group of historical service management requests each associated with n request parameters, (ii) mapping each historical service management request to an n-dimensional space based on the n request parameters, (iii) applying a clustering routine (e.g., a K-means clustering routine) to the n-dimensional space to generate m clusters each comprising a subset of the mappings of the historical service management requests, and (iv) for each inferred cluster, determining a rule/guideline that maps subranges of request parameters associated with the inferred cluster to a user-defined set of related ITSM server plugins for the inferred cluster.

The term "service plugin" may refer to a data construct that is configured to describe a set of operations stored in a storage subsystem of an ITSM collaboration system. The noted operations are configured to be executed by the ITSM collaboration system and, when executed, are configured to perform interface operations with respect to a mapped interface that is associated with the service plugin. In some embodiments, a service plugin is a software component executed by an ITSM collaboration system that is associated with a particular mapped interface and is configured to perform interface operations that are configured to request that the particular mapped interface requests that the corresponding service component associated with the service plugin performs particular target action operations. For example, a particular plugin may be associated with a text-based communication software application (e.g., Slack), and may be configured to perform interface operations that are configured to retrieve content data from a communication channel of the text-based communication software application that is associated with the service management request (e.g., that is associated with a team identifier for the service management request). As another example, a particular plugin may be associated with a videoconferencing communication software application (e.g., Zoom), and may be configured to perform interface operations that are configured to retrieve content data from a videoconferencing room of the videoconferencing communication software application that is associated with the service management request (e.g., that is associated with a team identifier for the service management request). In some embodiments, each service plugin of the ITSM collaboration system is associated with an asynchronous processing queue and a continuous execution thread.

The term "internal protocol request" may refer to a data construct that is generated by an ITSM collaboration system and provided to a computing component of the ITSM collaboration system that is associated with a particular plugin. The internal protocol request is a reformatted version of a service management request that is provided to a particular target plugin associated with the service management request, where reformatting of the service management request to generate an internal protocol request is performed in accordance with formatting requirements associated with the target plugin corresponding to the internal protocol request. For example, with respect to a target plugin of the ITSM collaboration system that is associated with a text-based communication software application, the internal protocol request may be generated by formatting the service management request based on the expected input format of the API calls associated with the text-based communication software application. As another example, with respect to a target plugin of the ITSM collaboration system that is associated with a videoconferencing communication software application, the internal protocol request may be generated by formatting the service management request based on the expected input format of audiovisual inputs associated with the videoconferencing communication software application.

The term "asynchronous processing queue" may refer to a data construct that is configured to describe a queue data object that stores a set of internal protocol requests associated with a particular plugin of an ITSM collaboration system, where the set of internal protocol requests have not been retrieved by a continuous execution thread of the particular plugin. The asynchronous processing queue is stored by a storage subsystem of the ITSM collaboration system. In some embodiments, the asynchronous processing queue describes a linked list of outstanding (i.e., unretrieved) internal protocol requests. In some embodiments, the asynchronous processing queue describes an array of outstanding (i.e., unretrieved) internal protocol requests.

The term "continuous execution thread" may refer to a data construct that is configured to describe a set of computer-implemented operations that are stored by the storage subsystem of an ITSM service collaboration system and are configured to be executed by the service collaboration computing device of the ITSM service collaboration system. The operations of the continuous execution thread may be configured to be continuously executable, such that a retrieval call is configured to be periodically made to the asynchronous processing queue to determine whether there are any internal protocol requests on the asynchronous processing queue. In some embodiments, once the continuous execution thread retrieves an internal protocol request from the asynchronous processing queue 401, the asynchronous processing queue removes the internal protocol request from the asynchronous processing queue.

The term "per-plugin action result indicator" may refer to a data construct that describes data generated by a service component and provided to an ITSM collaboration system. A per-plugin action result indicator describes the results of a target action performed by a service component based on a mapped interface routine call corresponding to an internal protocol request. In some embodiments, an internal protocol request describing a set of request parameters is mapped to a particular invocation of a mapped interface routine, then operations corresponding to the invocation are performed to cause a service component to perform target actions corresponding to the invocation. In some embodiments, per-plugin action result indicators describe output data generated by service components via performing operations corresponding to particular invocations of mapped interface routines corresponding to internal protocol requests. For example, when an internal protocol request corresponds to a text-based communication software application, the corresponding per-plugin action result indicator may describe text-based communication data retrieved from the text-based communication software application. As another example, when an internal protocol request corresponds to an audio-based communication software application, the corresponding per-plugin action result indicator may describe audio-based communication data retrieved from the audio-based communication software application. As yet another example, when an internal protocol request corresponds to a video-based communication software application, the corresponding per-plugin action result indicator may describe video-based communication data retrieved from the video-based communication software application.

The term "execution profile" may refer to a data construct that describes data generated by a continuous execution thread of a service plugin based on an internal protocol request retrieved from an asynchronous processing queue of the service plugin. The execution profile describes a validation indicator for the internal protocol request and a mapped interface routine of a plurality of defined interface routines for the service component that is associated with the internal protocol request. The validation indicator describes whether the request parameters described by the internal protocol request correspond to a valid application programming interface (API) call associated with the service component that is associated with the continuous execution thread. The mapped interface routine describes a set of computer-implemented operations that describe an API call of the service component that is mapped to the internal protocol request based on the request parameters described by the internal protocol request. Accordingly, the execution profile may describe whether an internal mapping request is a valid request to a target service component at all, and if so the API call of the target service component that is associated with the internal mapping request based on request parameters of the internal mapping request. In some embodiments, request parameters of the internal mapping request include an inferred action type indicator that can be directly mapped to an API call of the target service component by the continuous execution thread based on action mapping data associated with the continuous execution thread. In some of the noted embodiments, the continuous execution thread maps the internal protocol request to a mapped interface routine that performs operations corresponding to the mapped API call.

Example System Architecture

FIG. 1 is a block diagram of an example system 100 for ingesting, normalizing, and aggregating service management requests across a plurality of service components comprising one or more internal service components 121 and one or more external service components 131A-N. The system 100 comprises one or more client computing devices 102 and an Information Technology Service Management (ITSM) collaboration system 101. In some embodiments, the client computing devices 102 and the ITSM collaboration system 101 are configured to communicate over a communication network (not shown).

In some embodiments, a client computing device 102 is configured to provide a service management request to the ITSM collaboration system 101. The service management request may be a request for performing end-to-end delivery of an information technology service described by the service management request. An example of an information technology service is an incident management service, such as an incident management service that is performed by an incident management ITSM server system such as a Jira Service Management (JSM) platform. In some embodiments, the service management request describes a set of request parameters that describe one or more features of the corresponding information technology service requested by the service management request. In some embodiments, the service management request is mapped to a set of target plugins using a routing policy which maps the request parameters of the service management request to a target subset of a set of defined plugins associated with an ITSM server system.

After the ITSM collaboration system 101 receives the service management request, it stores the service management request in the storage subsystem 108 and subsequently identifies a target service subset of the plurality of service components for the service management request. To do so, the ITSM collaboration system 101 may execute operations corresponding to a routing policy stored in the storage subsystem 108 by the service collaboration computing device 106. The routing policy may define user-defined rules/guidelines and/or inferred rules/guidelines for mapping a service management request to a target subset from a set of service components associated with the ITSM collaboration system. In some embodiments, an inferred rule/guideline of a routing policy may be determined by clustering a group of historical service management requests each associated with n request parameters and using an n-dimensional clustering space, and then associating each inferred cluster to a related subset of the plugins of the ITSM collaboration system 101 based on user-defined cluster-plugin association data. For example, in some embodiments, generating a set of inferred rule/guidelines comprises: (i) identifying a group of historical service management requests each associated with n request parameters, (ii) mapping each historical service management request to an n-dimensional space based on the n request parameters, (iii) applying a clustering routine (e.g., a K-means clustering routine) to the n-dimensional space to generate m clusters each comprising a subset of the mappings of the historical service management requests, and (iv) for each inferred cluster, determining a rule/guideline that maps subranges of request parameters associated with the inferred cluster to a user-defined set of related ITSM server plugins for the inferred cluster.

After the service collaboration computing device 106 executes operations corresponding to the routing policy to identify a target service subset of the plurality of service components, the service collaboration computing device 106 identifies a target plugin subset of the service plugins 141 that correspond to the target service subset of the plurality of service components. In some embodiments, each service component is associated with a respective service plugin. In some embodiments, a service plugin is a software component executed by the ITSM collaboration system 101 that is configured to perform interface operations that are configured to request that the particular mapped interface requests that the service component associated with the service plugin performs particular target action operations. For example, a particular plugin may be associated with a text-based communication software application (e.g., Slack), and may be configured to perform interface operations that are configured to retrieve content data from a communication channel of the text-based communication software application that is associated with the service management request (e.g., that is associated with a team identifier for the service management request). As another example, a particular plugin may be associated with a videoconferencing communication software application (e.g., Zoom), and may be configured to perform interface operations that are configured to retrieve content data from a videoconferencing room of the videoconferencing communication software application that is associated with the service management request (e.g., that is associated with a team identifier for the service management request). In some embodiments, each service plugin of the ITSM collaboration system 101 is associated with an asynchronous processing queue and a continuous execution thread.

After the service collaboration computing device 106 identifies the target plugin subset of the service plugins 141 for the service management request, the service collaboration computing device 106 first generates an internal protocol request for the service management request with respect to each of then service plugins 141 in the target plugin subset. In some embodiments, each internal protocol request is a reformatted version of a service management request that is provided to a particular target plugin associated with the service management request, where reformatting of the service management request to generate an internal protocol request is performed in accordance with formatting requirements associated with the target plugin corresponding to the internal protocol request. For example, with respect to a target plugin of the ITSM collaboration system 101 that is associated with a text-based communication software application, the internal protocol request may be generated by formatting the service management request based on the expected input format of the API calls associated with the text-based communication software application. As another example, with respect to a target plugin of the ITSM collaboration system 101 that is associated with a videoconferencing communication software application, the internal protocol request may be generated by formatting the service management request based on the expected input format of audiovisual inputs associated with the videoconferencing communication software application.

After the service collaboration computing device 106 generates n internal protocol requests for the n service plugins in the target plugin subset for the service management request, the service collaboration computing device 106 transmits each internal protocol request to its corresponding service plugin. Each service plugin is then configured to: (i) receive an internal protocol request, (ii) identify a mapped interface routine associated with the internal protocol request, (iii) invoke the mapped interface routine to request that the service component associated with the service plugin performs target action operations corresponding to the particular invocation of the mapped interface routine, (iv) in response to invoking the mapped interface routine, receive a per-plugin action result indicator that is generated by the service component associated with the service plugin based on the particular invocation of the mapped interface routine, and (v) provide the per-plugin action result indicator to the service collaboration computing device 106. Accordingly, the service collaboration computing device 106 is configured to receive, in response to n internal protocol requests transmitted to n target service plugins, n per-plugin action result indicators.

After the service collaboration computing device 106 receives the n per-plugin action result indicators from the n target service plugins, the service collaboration computing device 106 performs the following operations with respect to each per-plugin action result indicator of the n per-plugin action result indicators: (i) process content data associated with the per-plugin action result indicator using the inter-service collaboration engines 111 to generate a structured data representation of the per-plugin action result indicator, and (ii) store the structured data representation in the storage subsystem 108. Accordingly, the service collaboration computing device 106 may store n structured data representations corresponding to n per-plugin action result indicators that are received from the n target service plugins.

After the service collaboration computing device 106 stores the n structured data representations corresponding to n per-plugin action result indicators in the storage subsystem 108, the service collaboration computing device 106 may generate an action result message describing an action result state that is determined based on the n structured data representations. The service collaboration computing device 106 may then transmit the action result message to at least one of: (i) the request-initiating client computing device, and (ii) an external communication channel associated with the service management request.

As described above, the service collaboration computing device 106 communicates, via a set of service plugins 141, with a set of service components that comprise a set of internal service components 121 (e.g., internal service components 121A-N) and a set of external service components 131A-N. An internal service component may be a software application that is executed using processing resources that are local/internal to the ITSM collaboration system 101, while an external service component may be a software application that is executed using processing resources that are remote/external to the ITSM collaboration system 101. In some embodiments, communications between an external service component and the ITSM collaboration system 101 is performed using an external service plugin that is configured to establish a remote connection with the external service component using an access credentialing logic associated with the external service component. In some embodiments, communications between an internal service component and the ITSM collaboration system 101 is performed using an internal service plugin that is configured to establish a remote connection with the external service component without using any access credentialing logic associated with the internal service component.

As further described above, the service collaboration computing device 106 uses a set of inter-service collaboration engines 111 to generate a structured data representation of each received per-plugin action result indicator. Examples of inter-service collaboration engines 111 include a natural language processing (NLP) engine 111A, a machine learning (ML) engine 111B, an audio processing engine 111C, and a video processing engine 111D. Exemplary features of the NLP engine 111A, the ML engine 111B, the audio processing engine 111C, and the video processing engine 111D are described below.

An NLP engine 111A may be configured to process natural language content data associated with a per-plugin action result indicator to generate a structured data representation of the per-plugin action result indicator. The NLP engine 111A may in some embodiments be used to interpret natural language content data associated with payloads of per-plugin action result indicators received from service components associated with text-based communication software application (e.g., Slack). For example, in some embodiments, the NLP engine 111A may be configured to: (i) use one or more NLP machine learning models to extract one or more keywords from the natural language content data of a per-plugin action result indicator, and (ii) generate a structured data representation of the per-plugin action result indicator that describes the extracted keywords. As another example, in some embodiments, the NLP engine 111A may be configured to: (i) use one or more NLP machine learning models to extract one or more keywords and one or more corresponding predicted keyword significance values from the natural language content data of a per-plugin action result indicator, and (ii) generate a structured data representation of the per-plugin action result indicator that describes the extracted keywords and the respective predicted keyword significance values.

An ML engine 111B may be configured to process structured feature data associated with a per-plugin action result indicator to generate a structured data representation of the per-plugin action result indicator. The ML engine 111B may in some embodiments be used to interpret structured content data associated with payloads of per-plugin action result indicators received from service components associated with web-based analytics engines (e.g., Alexa). For example, in some embodiments, the ML engine 111B may be configured to: (i) use one or more trained machine learning models to extract one or more keywords from the structured feature data of a per-plugin action result indicator, and (ii) generate a structured data representation of the per-plugin action result indicator that describes the extracted keywords. As another example, in some embodiments, the ML engine 111B may be configured to: (i) use one or more trained machine learning models to extract one or more keywords and one or more corresponding predicted keyword significance values from the structured feature data of a per-plugin action result indicator, and (ii) generate a structured data representation of the per-plugin action result indicator that describes the extracted keywords and the respective predicted keyword significance values.

An audio processing engine 111C may be configured to process audio data associated with a per-plugin action result indicator to generate a structured data representation of the per-plugin action result indicator. The audio processing engine 111C may in some embodiments be used to interpret audio data associated with payloads of per-plugin action result indicators received from service components associated with an audio-based communication software application (e.g., WhatsApp). For example, in some embodiments, the audio processing engine 111C may be configured to: (i) use one or more trained machine learning models to extract one or more keywords from the audio data of a per-plugin action result indicator, and (ii) generate a structured data representation of the per-plugin action result indicator that describes the extracted keywords. As another example, in some embodiments, the audio processing engine 111C may be configured to: (i) use one or more trained machine learning models to extract one or more keywords and one or more corresponding predicted keyword significance values from the audio data of a per-plugin action result indicator, and (ii) generate a structured data representation of the per-plugin action result indicator that describes the extracted keywords and the respective predicted keyword significance values. In some embodiments, the audio processing engine 111C generates a textual representation of audio data received from an audio-based service plugin, where the textual representation is then configured to be processed by the NLP engine 111A to generate a per-plugin action result indicator for the audio-based service plugin.

A video processing engine 111D may be configured to process video data associated with a per-plugin action result indicator to generate a structured data representation of the per-plugin action result indicator. The video processing engine 111D may in some embodiments be used to interpret video data associated with payloads of per-plugin action result indicators received from service components associated with an video-based communication software application (e.g., Zoom). For example, in some embodiments, the video processing engine 111D may be configured to: (i) use one or more trained machine learning models to extract one or more keywords from the video data of a per-plugin action result indicator, and (ii) generate a structured data representation of the per-plugin action result indicator that describes the extracted keywords. As another example, in some embodiments, the video processing engine 111D may be configured to: (i) use one or more trained machine learning models to extract one or more keywords and one or more corresponding predicted keyword significance values from the video data of a per-plugin action result indicator, and (ii) generate a structured data representation of the per-plugin action result indicator that describes the extracted keywords and the respective predicted keyword significance values. In some embodiments, the video processing engine 111D generates a textual representation of video data received from a video-based service plugin, where the textual representation is then configured to be processed by the NLP engine 111A to generate a per-plugin action result indicator for the video-based service plugin.

Exemplary Service Collaboration Computing Device

Figure 2:
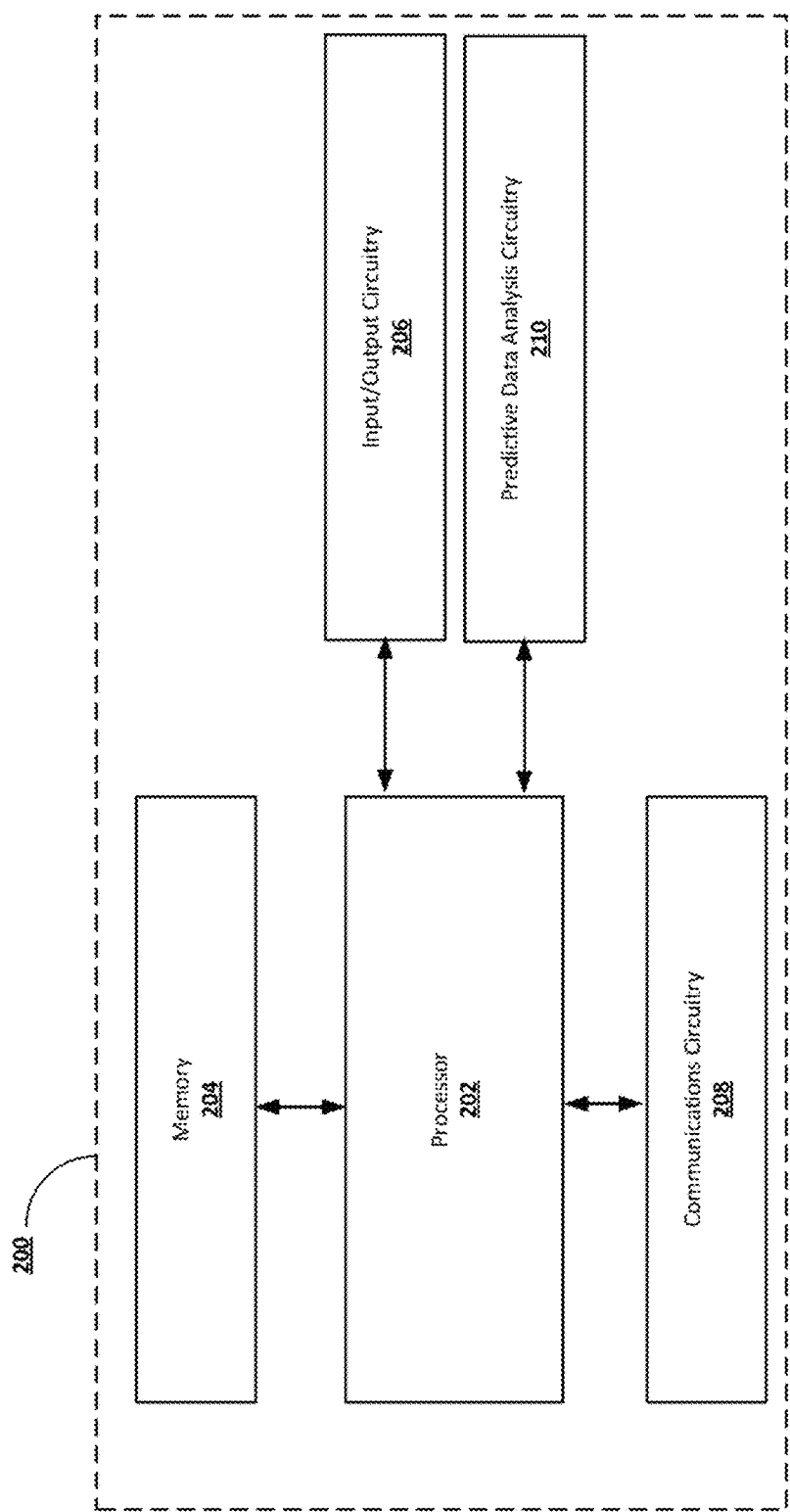
FIG. 2 is a block diagram of an example service collaboration computing device in accordance with at least some embodiments of the present invention.

The service collaboration computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations (e.g., using ML and/or NLP models). For example, the predictive data analysis circuitry 210 may include specialized circuitry that are configured to perform machine learning operations in an expedited manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
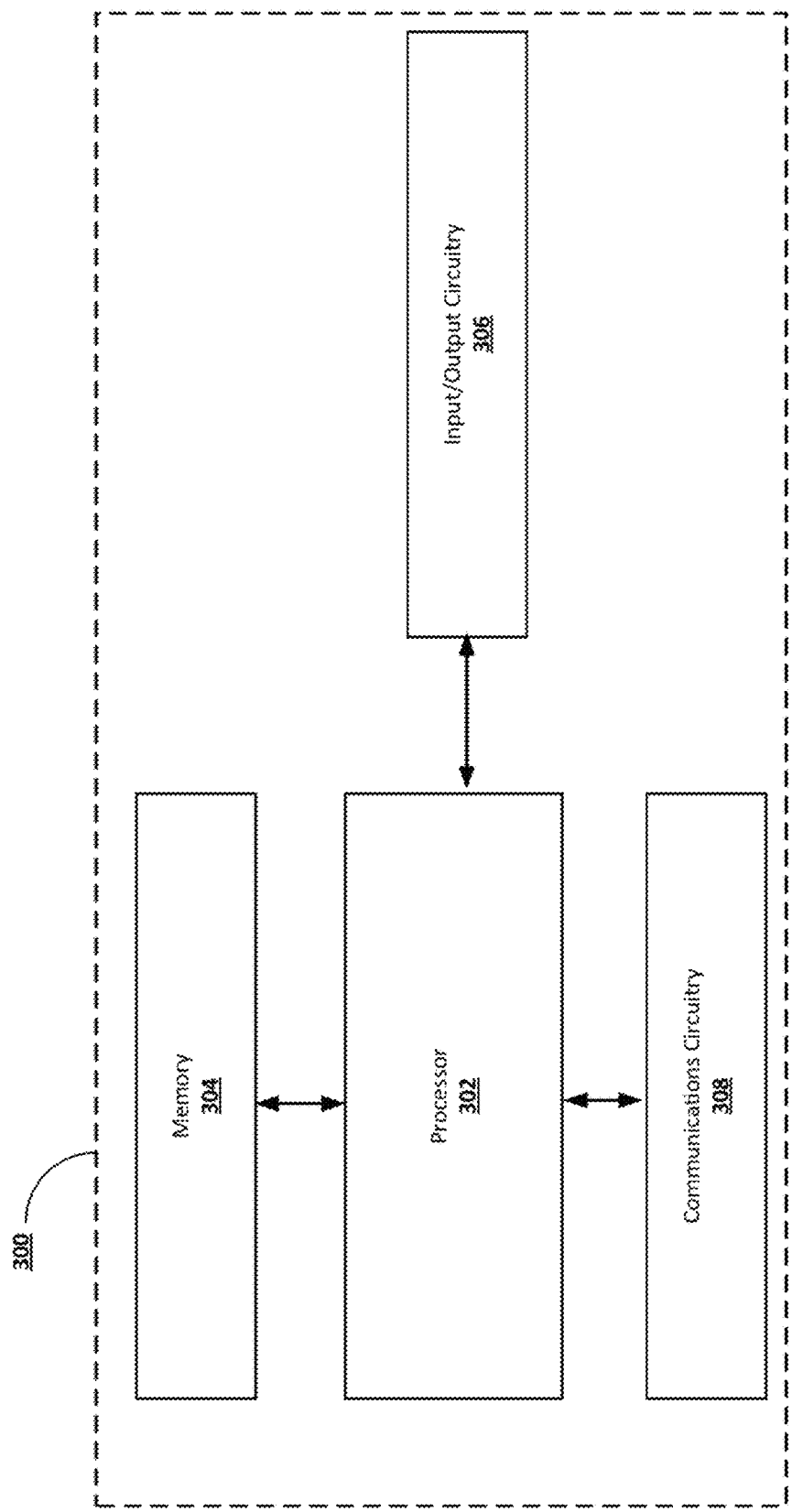
FIG. 3 is a block diagram of an example client computing device in accordance with at least some embodiments of the present invention.

Referring now to FIG. 3, a client computing device 102 may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are exemplary operations for facilitating communications between an ITSM collaboration system and an external service component, as well as for facilitating communications between an ITSM collaboration system and an internal service component. However, a person of ordinary skill in the relevant technology will recognize that: (i) the exemplary operations provided herein for facilitating communications between an ITSM collaboration system and an external service component can be performed without the exemplary operations described herein for facilitating communications between an ITSM collaboration system and an internal service component (e.g., with different operations for facilitating communications between an ITSM collaboration system and an internal service component), (ii) the exemplary operations provided herein for facilitating communications between an ITSM collaboration system and an internal service component can be performed without the exemplary operations described herein for facilitating communications between an ITSM collaboration system and an external service component (e.g., with different operations for facilitating communications between an ITSM collaboration system and an external service component), and (iii) the two sets of operations described herein can be performed by different computing devices, different computing entities, and/or different computing systems.

External Service Plugin Operations

Figure 4:
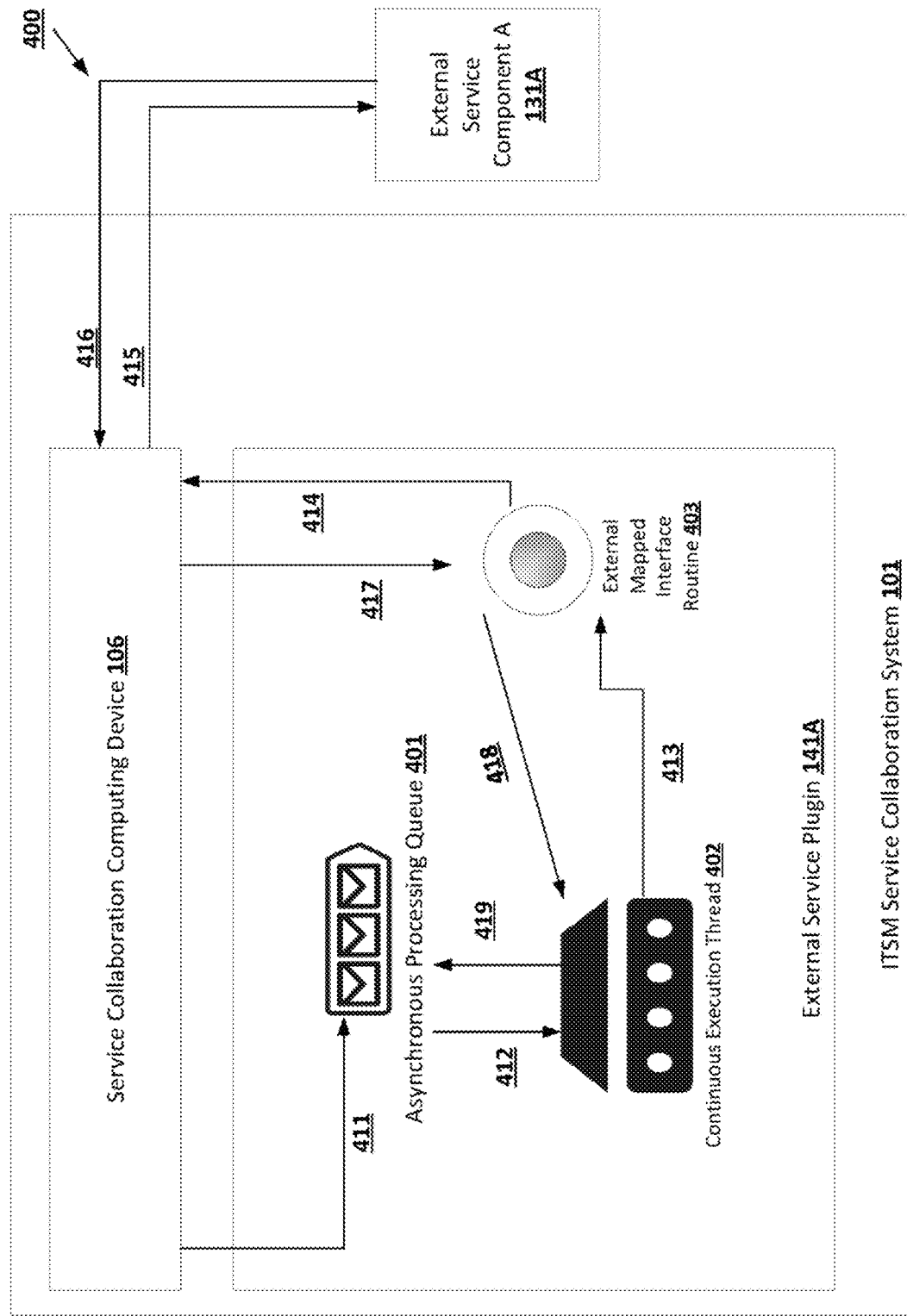
FIG. 4 is a data flow diagram of an example process for facilitating communications between an information technology service management collaboration system and an external service component in accordance with at least some embodiments of the present invention.

As described above, the service collaboration computing device 106 uses an external service plugin, such as the external service plugin 141A of FIG. 4, to communicate with an external service component, such as the external service component 131A. In some embodiments, interactions between the service collaboration computing device 106 and the external service component 131A are performed in accordance with the process 400 of FIG. 4. As depicted in FIG. 4, the service collaboration computing device 106 first generates an internal protocol request for the external service plugin 141A based on the request parameters of the corresponding service management request.

In some embodiments, to generate an internal protocol request for a service management request with respect to the external service plugin 141A, the service collaboration computing device 106 first retrieves formatting requirements associated with the external service component 131A that is the service component associated with the external service plugin 141A. The formatting requirements may define, for each request parameter of the service management request: (i) whether the request parameter corresponds to an input parameter of input application programming interface (API) calls associated with the external service component 131A, and (ii) if the request parameter corresponds to an input parameter of input application programming interface (API) calls associated with the external service component 131A, an indication of the corresponding input parameter associated with the request parameter.

Accordingly, in some embodiments, an internal protocol request is a reformatted version of a service management request that is provided to a particular target plugin associated with the service management request, where reformatting of the service management request to generate an internal protocol request is performed in accordance with formatting requirements associated with the target plugin corresponding to the internal protocol request. For example, with respect to a target plugin of the ITSM collaboration system 101 that is associated with a text-based communication software application, the internal protocol request may be generated by formatting the service management request based on the expected input format of the API calls associated with the text-based communication software application. As another example, with respect to a target plugin of the ITSM collaboration system 101 that is associated with a videoconferencing communication software application, the internal protocol request may be generated by formatting the service management request based on the expected input format of audiovisual inputs associated with the videoconferencing communication software application.

As further depicted in FIG. 4, after generating the internal protocol request, at operation 411, the service collaboration computing device 106 transmits the internal protocol request to an asynchronous processing queue 401 associated with the external service plugin 141A. In some embodiments, the asynchronous processing queue 401 is a queue data object that stores a set of internal protocol requests associated with a particular plugin of an ITSM collaboration system 101, where the set of internal protocol requests have not been retrieved by a continuous execution thread of the particular plugin. In some embodiments, the asynchronous processing queue describes a linked list of outstanding (i.e., unretrieved) internal protocol requests. In some embodiments, the asynchronous processing queue describes an array of outstanding (i.e., unretrieved) internal protocol requests.

At operation 412, the continuous execution thread 402 of the external service plugin 141A retrieves the internal protocol request from the asynchronous processing queue 401 based on the ordering logic associated with the asynchronous processing queue 401. The continuous execution thread 402 may describe a set of computer-implemented operations that are stored by the storage subsystem of the ITSM service collaboration system 101 and are configured to be executed by the service collaboration computing device 106 of the ITSM service collaboration system 101. The operations of the continuous execution thread 402 may be configured to be continuously executable, such that a retrieval call is configured to be periodically made to the asynchronous processing queue 401 to determine whether there are any internal protocol requests on the asynchronous processing queue 401. In some embodiments, once the continuous execution thread 402 retrieves an internal protocol request from the asynchronous processing queue 401, the asynchronous processing queue 401 removes the internal protocol request from the asynchronous processing queue 401.

Figure 6:
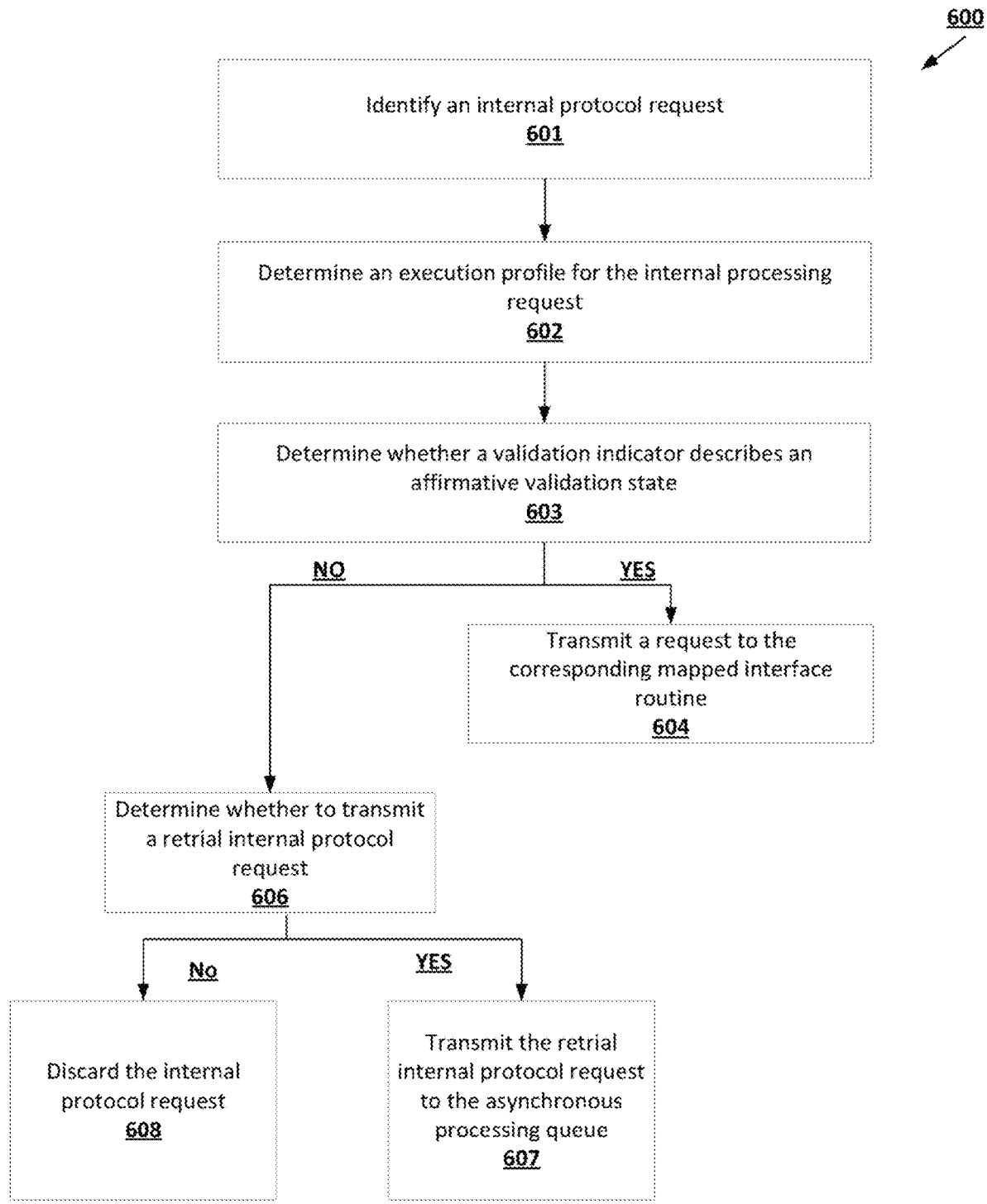
FIG. 6 is a flowchart diagram of an example process for performing pre-processing operations on an internal protocol request in accordance with at least some embodiments of the present invention.

In some embodiments, operation 412 may be performed in accordance with the process 600 that is depicted in FIG. 6. The process begins when, after retrieving the internal protocol request at operation 601, the continuous execution thread 402 proceeds to determine an execution profile for the internal protocol request at operation 602. The execution profile describes a validation indicator for the internal protocol request and a mapped interface routine of a plurality of defined interface routines for the service component that is associated with the internal protocol request. The validation indicator describes whether the request parameters described by the internal protocol request correspond to a valid application programming interface (API) call associated with the service component that is associated with the continuous execution thread 402. The mapped interface routine describes a set of computer-implemented operations that describe an API call of the service component that is mapped to the internal protocol request based on the request parameters described by the internal protocol request. Accordingly, the execution profile may describe whether an internal mapping request is a valid request to a target service component at all, and if so the API call of the target service component that is associated with the internal mapping request based on request parameters of the internal mapping request. In some embodiments, request parameters of the internal mapping request include an inferred action type indicator that can be directly mapped to an API call of the target service component by the continuous execution thread 402 based on action mapping data associated with the continuous execution thread 402. In some of the noted embodiments, the continuous execution thread 402 maps the internal protocol request to a mapped interface routine that performs operations corresponding to the mapped API call.

At operation 603, the continuous execution thread 402 determine, based on the validation indicator described by the execution profile, whether the internal mapping request describes an affirmative validation state. If the continuous execution thread 402 determines that the internal mapping request describes an affirmative validation state (i.e., describes that the internal mapping request can be mapped to an API call of the external service component 131A), then operation 604 may be performed. However, if the continuous execution thread 402 determines that the internal mapping request describes a negative validation state (i.e., describes that the internal mapping request cannot be mapped to an API call of the external service component 131A), then operations 606-608 may be performed.

At operation 604, the continuous execution thread 402 transmits a request to the corresponding mapped interface routine for the internal protocol request to perform operations corresponding to the mapped interface routine. In some embodiments, to transmit the request to the corresponding mapped interface routine, the continuous execution thread 402 first identifies the mapped interface routine corresponding to the internal protocol request as indicated by the execution profile for the internal protocol request, and then causes the service collaboration computing device 106 to execute mapped interface routine operations corresponding to the mapped interface routine.

At operation 606, the continuous execution thread 402 determines whether the request parameters associated with the internal protocol request require a retrial of the internal protocol request upon a validation failure. If so, at operation 607, the continuous execution thread 402 transmits a retrial internal protocol request associated with the internal protocol request (e.g., a copy of the original internal protocol request) to the asynchronous processing queue 401. However, if the continuous execution thread 402 determines that the request parameters associated with the internal protocol request do not require a retrial of the internal protocol request upon a validation failure, the continuous execution thread 402 discards the internal protocol request at operation 608.

Returning to FIG. 4, at operation 413, the continuous execution thread 402 invokes the external mapped interface routine 403 corresponding to the external service component 131A and the internal protocol request. Afterward, at operation 414, the external mapped interface routine 403 causes the service collaboration computing device 106 to, via operation 415, request that the external service component 131A performs target action operations corresponding to the external mapped interface routine 403. At operation 416, in response to the request transmitted at operation 415, the service collaboration computing device 106 receives the per-plugin action result indicator for that is then transmitted to the external mapped interface routine 403 at operation 417, which then subsequently transmits the per-plugin action result indicator to the continuous execution thread 402 at operation 418.

In some embodiments, a per-plugin action result indicator describes the results of a target action performed by a service component based on a mapped interface routine call corresponding to an internal protocol request. In some embodiments, an internal protocol request describing a set of request parameters is mapped to a particular invocation of a mapped interface routine, then operations corresponding to the invocation are performed to cause a service component to perform target actions corresponding to the invocation. In some embodiments, per-plugin action result indicators describe output data generated by service components via performing operations corresponding to particular invocations of mapped interface routines corresponding to internal protocol requests. For example, when an internal protocol request corresponds to a text-based communication software application, the corresponding per-plugin action result indicator may describe text-based communication data retrieved from the text-based communication software application. As another example, when an internal protocol request corresponds to an audio-based communication software application, the corresponding per-plugin action result indicator may describe audio-based communication data retrieved from the audio-based communication software application. As yet another example, when an internal protocol request corresponds to a video-based communication software application, the corresponding per-plugin action result indicator may describe video-based communication data retrieved from the video-based communication software application.

Figure 7:
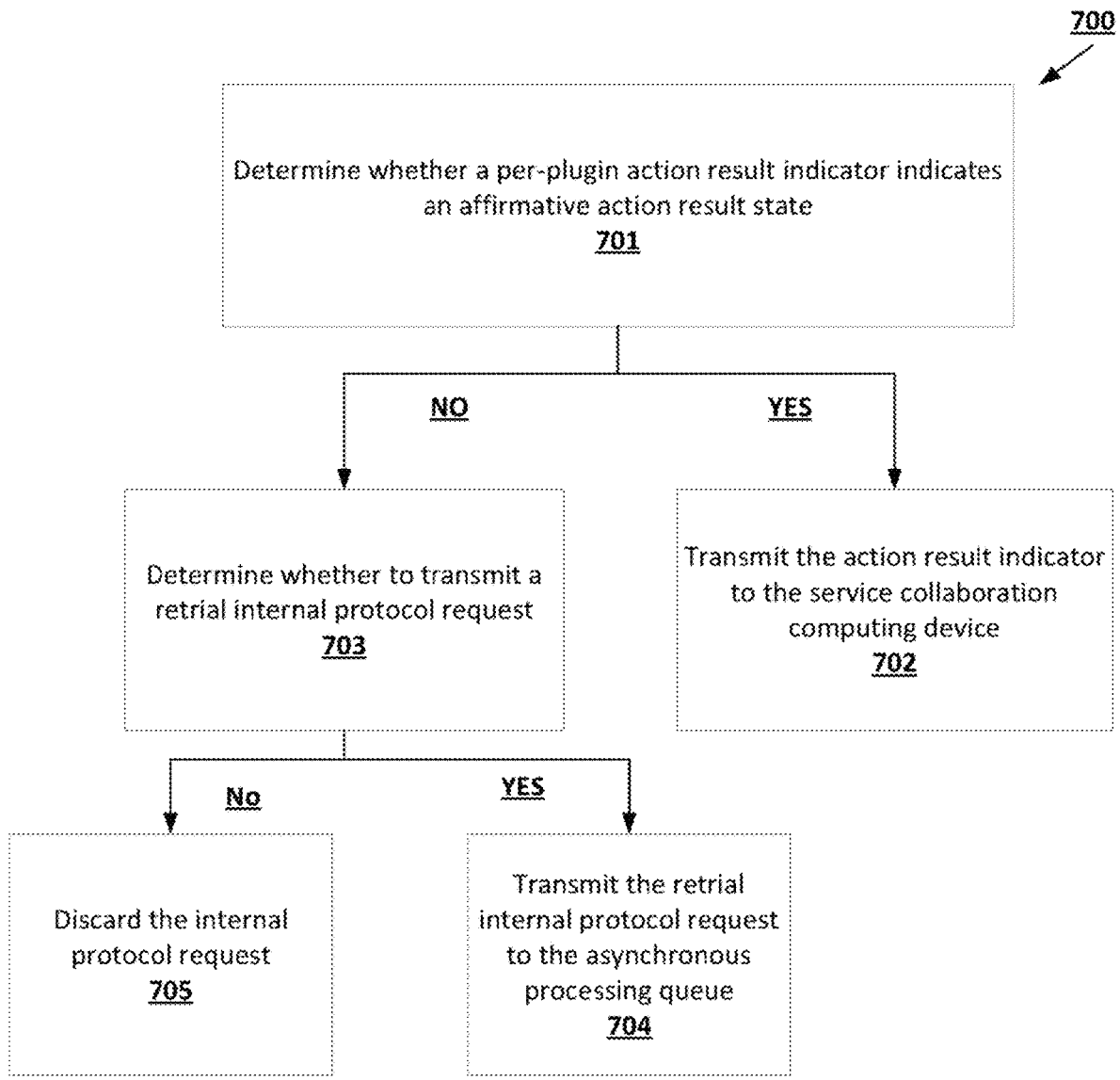
FIG. 7 is a flowchart diagram of an example process for performing post-processing operations on an internal protocol request in accordance with at least some embodiments of the present invention.

At operation 419, the continuous execution thread 402 performs one or more post-processing operations in relation to the internal processing request based on the per-plugin action result indicator. In some embodiments, operation 419 may be performed in accordance with the process 700 that is depicted in FIG. 7. As depicted in FIG. 7, the process 700 begins at operation 701 when the continuous execution thread 402 determines whether the per-plugin action result indicator describes an affirmative action result state (i.e., describes that the target action operations corresponding to the internal protocol request have been successfully performed by the external service component 131A). At operation 702, in response to determining that the per-plugin action result indicator describes an affirmative action result state (i.e., describes that the target action operations corresponding to the internal protocol request have been successfully performed by the external service component 131A), the continuous execution thread 402 transmits the action result indicator to the service collaboration computing device 106.

At operation 702, in response to determining that the per-plugin action result indicator describes a negative action result state (i.e., describes that the target action operations corresponding to the internal protocol request have been successfully performed by the external service component 131A), the continuous execution thread 402 determines whether the request parameters associated with the internal protocol request require a retrial of the internal protocol request upon an action result failure. If so, at operation 704, the continuous execution thread 402 transmits a retrial internal protocol request associated with the internal protocol request (e.g., a copy of the original internal protocol request) to the asynchronous processing queue 401. However, if the continuous execution thread 402 determines that the request parameters associated with the internal protocol request do not require a retrial of the internal protocol request upon an action result failure, the continuous execution thread 402 discards the internal protocol request at operation 705.

Returning to FIG. 4, once the service collaboration computing device 106 receives all per-plugin action result indicators for all of the target service plugins, then the service collaboration computing device 106 combines the per-plugin action result indicators for all of the target service plugins to generate an action result state and performs one or more prediction-based actions based on the action result state. In some embodiments, the service collaboration computing device 106 transmits an action result message describing an action result state to an external communication channel associated with the service management request, wherein the action result state is determined based on each per-plugin action result indicator.

Figure 8:
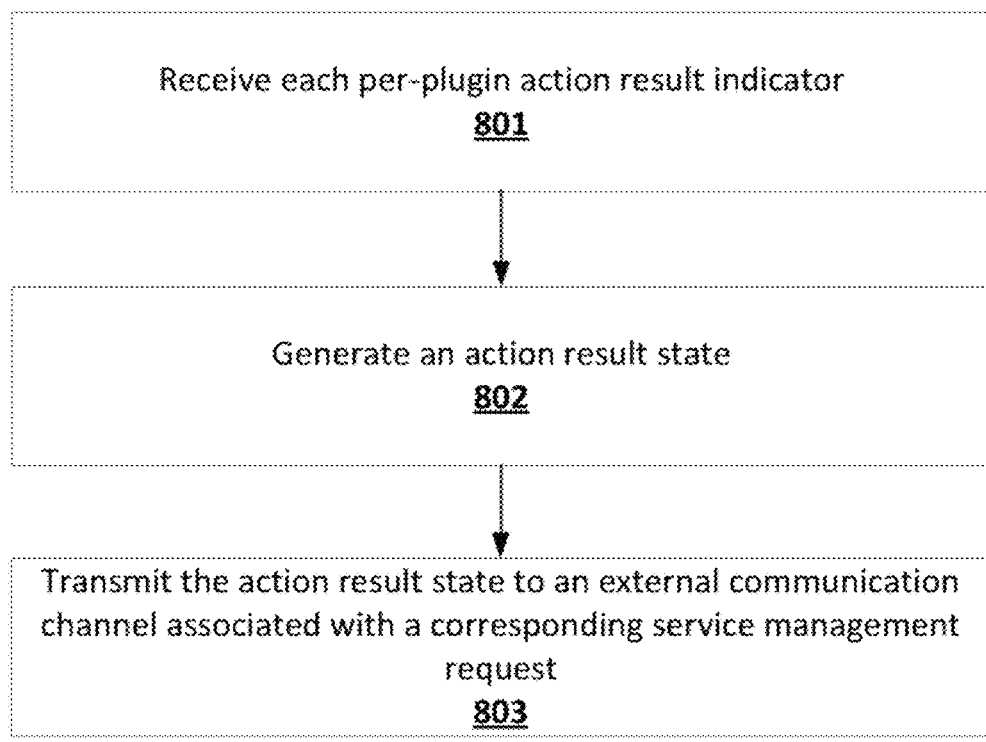
FIG. 8 is a flowchart diagram of an example process for generating an action result state based on a set of per-plugin action result indicators in accordance with at least some embodiments of the present invention.

In some embodiments, after the service collaboration computing device 106 receives all per-plugin action result indicators for all of the target service plugins, the service collaboration computing device 106 performs operations of the process 800 that is depicted in FIG. 8. The process 800 begins at operation 801 when the service collaboration computing device 106 receives all per-plugin action result indicators for all of the target service plugins. At operation 802, the service collaboration computing device 106 generates an action result state describing: (i) whether all of the received per-plugin action result indicators describe an affirmative action result state, and (ii) if all of the received per-plugin action result indicators describe an affirmative action result state, a combination of structured data representations generated based on content data associated with the all of the received per-plugin action result indicators describe an affirmative action result state.

In some embodiments, after the service collaboration computing device 106 receives the n per-plugin action result indicators from the n target service plugins, the service collaboration computing device 106 performs the following operations with respect to each per-plugin action result indicator of the n per-plugin action result indicators: (i) process content data associated with the per-plugin action result indicator using the inter-service collaboration engines 111 to generate a structured data representation of the per-plugin action result indicator, and (ii) store the structured data representation in the storage subsystem 108. Accordingly, the service collaboration computing device 106 may store n structured data representations corresponding to n per-plugin action result indicators that are received from the n target service plugins. In some embodiments, after the service collaboration computing device 106 stores the n structured data representations corresponding to n per-plugin action result indicators in the storage subsystem 108, the service collaboration computing device 106 may generate an action result message describing an action result state that is determined based on the n structured data representations. The service collaboration computing device 106 may then transmit the action result message to at least one of: (i) the request-initiating client computing device, and (ii) an external communication channel associated with the service management request.

At operation 803, the service collaboration computing device 106 transmits an action result message describing the action result state to an external communication channel (e.g., a Slack channel) associated with the service management request. For example, in some embodiments, the service collaboration computing device 106 transmits an action result message describing the action result state to an external communication channel (e.g., a Slack channel) associated a team responsible for processing with the service management request. As another example, in some embodiments, the service collaboration computing device 106 transmits an action result message describing the action result state to an external communication channel (e.g., a Slack channel) associated a team responsible for processing with the service management request and a topical association of the service management request. In some embodiments, the action result message is a message describing success or failure of performing all of the target action operations corresponding to the n internal protocol requests generated based on a corresponding service management request.

Internal Service Plugin Operations

Figure 5:
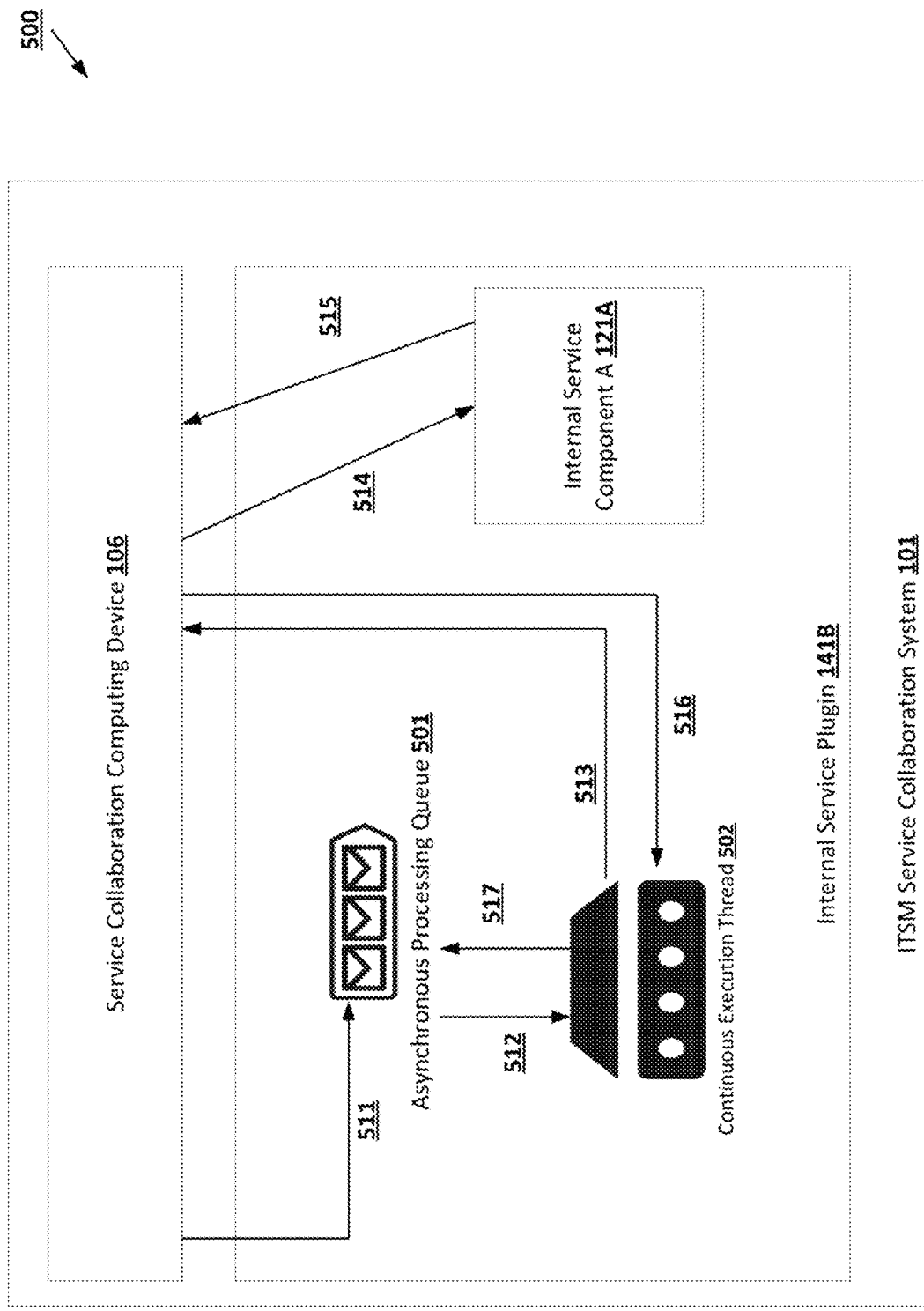
FIG. 5 is a data flow diagram of an example process for facilitating communications between an information technology service management collaboration system and an internal service component in accordance with at least some embodiments of the present invention.

As described above, the service collaboration computing device 106 uses an internal service plugin, such as the internal service plugin 141B of FIG. 5, to communicate with an internal service component, such as the internal service component 121A. In some embodiments, interactions between the service collaboration computing device 106 and the internal service component 121A are performed in accordance with the process 500 of FIG. 5. As depicted in FIG. 5, the service collaboration computing device 106 first generates an internal protocol request for the internal service plugin 141B based on the request parameters of the corresponding service management request.

In some embodiments, to generate an internal protocol request for a service management request with respect to the internal service plugin 141B, the service collaboration computing device 106 first retrieves formatting requirements associated with the internal service component 121A that is the service component associated with the internal service plugin 141B. The formatting requirements may define, for each request parameter of the service management request: (i) whether the request parameter corresponds to an input parameter of input application programming interface (API) calls associated with the internal service component 121A, and (ii) if the request parameter corresponds to an input parameter of input application programming interface (API) calls associated with the internal service component 121A, an indication of the corresponding input parameter associated with the request parameter.

Accordingly, in some embodiments, an internal protocol request is a reformatted version of a service management request that is provided to a particular target plugin associated with the service management request, where reformatting of the service management request to generate an internal protocol request is performed in accordance with formatting requirements associated with the target plugin corresponding to the internal protocol request. For example, with respect to a target plugin of the ITSM collaboration system 101 that is associated with a text-based communication software application, the internal protocol request may be generated by formatting the service management request based on the expected input format of the API calls associated with the text-based communication software application. As another example, with respect to a target plugin of the ITSM collaboration system 101 that is associated with a videoconferencing communication software application, the internal protocol request may be generated by formatting the service management request based on the expected input format of audiovisual inputs associated with the videoconferencing communication software application.

As further depicted in FIG. 5, after generating the internal protocol request, at operation 511, the service collaboration computing device 106 transmits the internal protocol request to an asynchronous processing queue 501 associated with the internal service plugin 141B. In some embodiments, the asynchronous processing queue 501 is a queue data object that stores a set of internal protocol requests associated with a particular plugin of an ITSM collaboration system 101, where the set of internal protocol requests have not been retrieved by a continuous execution thread of the particular plugin. In some embodiments, the asynchronous processing queue describes a linked list of outstanding (i.e., unretrieved) internal protocol requests. In some embodiments, the asynchronous processing queue describes an array of outstanding (i.e., unretrieved) internal protocol requests.

At operation 512, the continuous execution thread 502 of the internal service plugin 141B retrieves the internal protocol request from the asynchronous processing queue 501 based on the ordering logic associated with the asynchronous processing queue 501. The continuous execution thread 502 may describe a set of computer-implemented operations that are stored by the storage subsystem of the ITSM service collaboration system 101 and are configured to be executed by the service collaboration computing device 106 of the ITSM service collaboration system 101. The operations of the continuous execution thread 502 may be configured to be continuously executable, such that a retrieval call is configured to be periodically made to the asynchronous processing queue 501 to determine whether there are any internal protocol requests on the asynchronous processing queue 501. In some embodiments, once the continuous execution thread 502 retrieves an internal protocol request from the asynchronous processing queue 501, the asynchronous processing queue 501 removes the internal protocol request from the asynchronous processing queue 501. In some embodiments, operation 512 may be performed in accordance with the underlying logic of the process 600 that is depicted in FIG. 6.

At operation 513, the continuous execution thread 502 causes the service collaboration computing device 106 to, via operation 514, request that the internal service component 121A performs target action operations corresponding to the internal protocol request. At operation 515, in response to the request transmitted at operation 514, the service collaboration computing device 106 receives the per-plugin action result indicator for that is then transmitted to the continuous execution thread 502, which then subsequently transmits the per-plugin action result indicator to the continuous execution thread 502 at operation 516.

In some embodiments, a per-plugin action result indicator describes the results of a target action performed by a service component based on a mapped interface routine call corresponding to an internal protocol request. In some embodiments, an internal protocol request describing a set of request parameters is mapped to a particular invocation of a mapped interface routine, then operations corresponding to the invocation are performed to cause a service component to perform target actions corresponding to the invocation. In some embodiments, per-plugin action result indicators describe output data generated by service components via performing operations corresponding to particular invocations of mapped interface routines corresponding to internal protocol requests. For example, when an internal protocol request corresponds to a text-based communication software application, the corresponding per-plugin action result indicator may describe text-based communication data retrieved from the text-based communication software application. As another example, when an internal protocol request corresponds to an audio-based communication software application, the corresponding per-plugin action result indicator may describe audio-based communication data retrieved from the audio-based communication software application. As yet another example, when an internal protocol request corresponds to a video-based communication software application, the corresponding per-plugin action result indicator may describe video-based communication data retrieved from the video-based communication software application.

At operation 517, the continuous execution thread 402 performs one or more post-processing operations in relation to the internal processing request based on the per-plugin action result indicator. In some embodiments, operation 517 may be performed in accordance with the underlying logic of the process 700 that is depicted in FIG. 7. After the service collaboration computing device 106 receives all per-plugin action result indicators for all of the target service plugins, then the service collaboration computing device 106 combines the per-plugin action result indicators for all of the target service plugins to generate an action result state and performs one or more prediction-based actions based on the action result state. In some embodiments, the service collaboration computing device 106 transmits an action result message describing an action result state to an external communication channel associated with the service management request, wherein the action result state is determined based on each per-plugin action result indicator. In some embodiments, after the service collaboration computing device 106 receives all per-plugin action result indicators for all of the target service plugins, the service collaboration computing device 106 performs operations of the process 800 that is depicted in FIG. 8.

Other examples of post-processing operations that may be performed include aggregating all of per-plugin action result indicators associated with both internal service plugin and external service plugins in order to generate a holistic discussion data object and store the holistic discussion data object for further processing. The holistic discussion data objects for a set of historical service management requests (e.g., a set of historical incident reports) then can be used to determine participant profiles for incoming service management requests (e.g., incoming incident reports) based on participant profiles for the historical service management requests.

For example, in some embodiments, n historical holistic discussion data objects for n historical service management requests are processed using an embedding machine learning model to generate n historical holistic embeddings. Then, an incoming holistic discussion data object for an incoming service management request can is also processed using the embedding machine learning model to generate an incoming holistic embedding. Then, of the n historical holistic embeddings, a selected subset that is deemed most similar to the incoming holistic embedding is identified. In some embodiments, the participant profiles associated with at least one of the n historical holistic embeddings in the selected subset (e.g., those participant profiles each associated with all of the n historical holistic embeddings in the selected subset) as recommended participant profiles for the incoming service management request. In some embodiments, a communication session (e.g., a videoconferencing meeting and/or an audioconferencing meeting) is generated for the incoming service management request, where the recommended participant profiles are invited to the communication session.

As another example, in some embodiments, n historical holistic discussion data objects for n historical service management requests are processed using a tagging machine learning model to generate n historical tag sets each including a set of inferred tags for a historical service management request. Then, an incoming holistic discussion data object for an incoming service management request can is also processed using the tagging machine learning model to generate an incoming tag set for the incoming service management request. Then, of the n tag sets, a selected subset that is deemed most similar to the incoming tag set is identified. In some embodiments, the participant profiles associated with at least one of the n historical tag sets in the selected subset (e.g., those participant profiles each associated with all of the n historical tag sets in the selected subset) as recommended participant profiles for the incoming service management request. In some embodiments, a communication session (e.g., a videoconferencing meeting and/or an audioconferencing meeting) is generated for the incoming service management request, where the recommended participant profiles are invited to the communication session.

Accordingly, by using the techniques noted above, during each processing iteration, an ITSM collaboration system performs m operations, where each operation corresponds to the continuous execution thread of a distinct service plugin that is associated with a distinct service component. Accordingly, each of the m operations needs to only retrieve configuration data associated with a single service component, which has a constant computational complexity assuming a constant amount of per-component configuration data. In this way, various embodiments of the present invention reduce the computational complexity of performing operations needed to facilitate communications between an ITSM collaboration system and a set of service components including internal service components and external service components, and improve computational efficiency of designing software architecture of collaborative software application frameworks that enable interactions between an ITSM collaboration system and a set of service components including internal service components and external service components.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A service collaboration apparatus configured to ingest, normalize, and aggregate service management requests across a plurality of service components comprising one or more internal service components and one or more external service components comprising at least one processor and at least one memory including program code, the at least one memory and the program code configured to, with the at least one processor, cause the service collaboration apparatus to at least:
receive a service management request, wherein the service management request is associated with one or more request parameters;
determine, based on the one or more request parameters and using a routing policy for a plurality of service plugins, a target plugin subset of the plurality of service plugins, wherein the plurality of service plugins comprise first service plugins associated with the one or more internal service components and second service plugins associated with the one or more external service components;
for each target plugin in the target plugin subset, execute a mapped interface routine corresponding to the target plugin, the mapped interface routine comprising:
transmitting an internal protocol request comprising an action performance request associated with the target plugin to an asynchronous processing queue associated with the target plugin, and
after transmitting the internal protocol request, receiving a per-plugin action result indicator that is (i) generated by a corresponding internal service component or external service component associated with the target plugin based on the internal protocol request for the target plugin, and (ii) generated by executing one or more interface routine invocation operations corresponding to the mapped interface routine responsive to determining a validation indicator describes an affirmative validation state; and
transmit an action result message describing an action result state to an external communication channel associated with the service management request, wherein the action result state is determined based on each per-plugin action result indicator.

2. The service collaboration apparatus of claim 1, wherein each per-plugin action result indicator for a particular target plugin is generated by:
retrieving, using a continuous execution thread of the particular target plugin, the internal protocol request associated with the particular target plugin from the asynchronous processing queue associated with the particular target plugin; and
determining an execution profile for the internal protocol request associated with the particular target plugin, where the execution profile describes a validation indicator for the internal protocol request and the mapped interface routine.

3. The service collaboration apparatus of claim 2, wherein the execution profile further describes a retrial indicator for the internal protocol request.

4. The service collaboration apparatus of claim 3, wherein the continuous execution thread is configured to, in response to determining that the validation indicator describes a negative validation state and the retrial indicator describes an affirmative retrial indicator, generate a retrial internal protocol request based on the one or more request parameters and transmit the retrial internal protocol request to the asynchronous processing queue.

5. The service collaboration apparatus of claim 2, wherein the continuous execution thread is configured to:
in response to determining that the per-plugin action result indicator describes a negative action result state, determine an intermittent failure indicator for the internal protocol request, and
in response to determining that the intermittent failure indicator describes an affirmative intermittent failure state, generate a retrial internal protocol request based on the one or more request parameters and transmit the retrial internal protocol request to the asynchronous processing queue.

6. The service collaboration apparatus of claim 5, wherein the intermittent failure indicator is determined based on one or more interface routine updates transmitted by the mapped interface routine to the external communication channel.

7. The service collaboration apparatus of claim 2, wherein the continuous execution thread is configured to:
in response to determining that the per-plugin action result indicator describes a negative action result state, determine an intermittent failure indicator for the internal protocol request, and
in response to determining that the intermittent failure indicator describes a negative intermittent failure state, transmit a discarding request associated with the internal protocol request to the asynchronous processing queue.

8. The service collaboration apparatus of claim 2, wherein the continuous execution thread is further configured to:
in response to determining that the validation indicator describes the affirmative validation state, provide the per-plugin action result indicator to a plugin application programming interface (API) of the particular target plugin.

9. The service collaboration apparatus of claim 8, wherein:

the service management request is received from a request-initiating client system by a platform API, the plugin API is configured to provide the per-plugin action result indicator to the platform API, and the platform API is configured to provide the per-plugin action result indicator to the request-initiating client system.

10. The service collaboration apparatus of claim 1, wherein the at least one memory and the program code are further configured to, with the at least one processor, cause the service collaboration apparatus to at least:

determine, based on the action result state, a holistic discussion data object;

determine, based on comparing the holistic discussion data object and a plurality of historical discussion data objects, a similar subset of the plurality of historical discussion data objects, wherein each historical discussion data object is associated with a participant profile set; and determine, based on each participant profile set for the similar subset, one or more recommended participant profiles for the holistic discussion data object.

11. The service collaboration apparatus of claim 10, wherein comparing the holistic discussion data object and the plurality of historical discussion data objects comprises comparing a holistic embedding of the holistic discussion data object and a plurality of historical holistic embeddings for the plurality of historical discussion data objects.

12. The service collaboration apparatus of claim 10, wherein comparing the holistic discussion data object and the plurality of historical discussion data objects comprises comparing a holistic tag set of the holistic discussion data object and a plurality of historical holistic tag sets for the plurality of historical discussion data objects.

13. A computer-implemented method for ingesting, normalizing, and aggregating service management requests across a plurality of service components comprising one or more internal service components and one or more external service components comprising at least one processor and at least one memory including program code, the computer-implemented method comprising:

receiving a service management request, wherein the service management request is associated with one or more request parameters;

determining, based on the one or more request parameters and using a routing policy for a plurality of service plugins, a target plugin subset of the plurality of service plugins, wherein the plurality of service plugins comprise first service plugins associated with the one or more internal service components and second service plugins associated with the one or more external service components;

for each target plugin in the target plugin subset, execute a mapped interface routine corresponding to the target plugin, the mapped interface routine comprising:

transmitting an internal protocol request comprising an action performance request associated with the target plugin to an asynchronous processing queue associated with the target plugin, and after transmitting the internal protocol request, receiving a per-plugin action result indicator that is (i) generated by a corresponding internal service component or external service component associated with the target plugin based on the internal protocol request for the target plugin, and (ii) generated by executing one or more interface routine invocation operations corresponding to the mapped interface routine responsive to determining a validation indicator describes an affirmative validation state; and transmitting an action result message describing an action result state to an external communication channel associated with the service management request, wherein the action result state is determined based on each per-plugin action result indicator.

14. The computer-implemented method of claim 13, wherein each per-plugin action result indicator for a particular target plugin is generated by:

retrieving, using a continuous execution thread of the particular target plugin, the internal protocol request associated with the particular target plugin from the asynchronous processing queue associated with the particular target plugin; and determining an execution profile for the internal protocol request associated with the particular target plugin, where the execution profile describes a validation indicator for the internal protocol request and the mapped interface routine.

15. The computer-implemented method of claim 14, wherein the execution profile further describes a retrial indicator for the internal protocol request.

16. The computer-implemented method of claim 15, wherein the continuous execution thread is configured to, in response to determining that the validation indicator describes a negative validation state and the retrial indicator describes an affirmative retrial indicator, generate a retrial internal protocol request based on the one or more request parameters and transmit the retrial internal protocol request to the asynchronous processing queue.

17. The computer-implemented method of claim 14, wherein the continuous execution thread is configured to:

in response to determining that the per-plugin action result indicator describes a negative action result state, determine an intermittent failure indicator for the internal protocol request, and in response to determining that the intermittent failure indicator describes an affirmative intermittent failure state, generate a retrial internal protocol request based on the one or more request parameters and transmit the retrial internal protocol request to the asynchronous processing queue.

18. The computer-implemented method of claim 14, wherein the continuous execution thread is configured to:

in response to determining that the per-plugin action result indicator describes a negative action result state, determine an intermittent failure indicator for the internal protocol request, and in response to determining that the intermittent failure indicator describes a negative intermittent failure state, transmit a discarding request associated with the internal protocol request to the asynchronous processing queue.

19. A computer program product configured to ingest, normalize, and aggregate service management requests across a plurality of service components comprising one or more internal service components and one or more external service components comprising at least one processor and at least one memory including program code, the computer program product comprising at least one non-transitory computer-readable storage medium having computer-readable program code portions stored therein, the computer-readable program code portions configured to:

receive a service management request, wherein the service management request is associated with one or more request parameters;

determine, based on the one or more request parameters and using a routing policy for a plurality of service plugins, a target plugin subset of the plurality of service plugins, wherein the plurality of service plugins comprise first service plugins associated with the one or more internal service components and second service plugins associated with the one or more external service components;

for each target plugin in the target plugin subset, execute a mapped interface routine corresponding to the target plugin, the mapped interface routine comprising:

transmitting an internal protocol request comprising an action performance request associated with the target plugin to an asynchronous processing queue associated with the target plugin, and after transmitting to the internal protocol request, receiving a per-plugin action result indicator that is (i) generated by a corresponding internal service component or external service component associated with the target plugin based on the internal protocol request for the target plugin, and (ii) generated by executing one or more interface routine invocation operations corresponding to the mapped interface routine responsive to determining a validation indicator describes an affirmative validation state; and transmit an action result message describing an action result state to an external communication channel associated with the service management request, wherein the action result state is determined based on each per-plugin action result indicator.

20. The computer program product of claim 19, wherein each per-plugin action result indicator for a particular target plugin is generated by:

retrieving, using a continuous execution thread of the particular target plugin, the internal protocol request associated with the particular target plugin from the asynchronous processing queue associated with the particular target plugin; and determining an execution profile for the internal protocol request associated with the particular target plugin, where the execution profile describes a validation indicator for the internal protocol request and the mapped interface routine.

\* \* \* \* \*